Sept. 12, 1950      J. V. MODESTO      2,522,292

FISHHOOK GUARD

Filed June 24, 1949

Inventor.
James V. Modesto.
By W. F. Kellogg
Atty.

Patented Sept. 12, 1950

2,522,292

UNITED STATES PATENT OFFICE 2,522,292

FISHHOOK GUARD

James V. Modesto, Chicago, Ill.

Application June 24, 1949, Serial No. 101,151

11 Claims. (Cl. 43—43.4)

This invention relates to improvements in weedless fish hooks, having for an object to provide a hook of the indicated character, having novel and practical guard means cooperatively associated therewith in such a manner as to prevent the same from being caught, snagged or otherwise engaged in or with weeds, brush, stumps or other obstructions during use, as by casting or trolling; the guard means being so constructed as to effect constant, positive shielding of the equipped hook or hooks, and at the same time, permit the hooks to be retained at "ready," so that when struck and taken by a fish, they will be securely fixed and/or set, hence, insuring the catch.

Another object of the invention is to provide a fish hook weed or snag guard of simple and sturdy construction, sufficiently light in weight to avoid objectionable burdening of an equipped hook, thus allowing the making of long and/or highly satisfactory casts.

Yet another object of the invention is to provide a device of the indicated character, capable of being conveniently and readily attached to various forms of baits and/or lures, and which in itself will enhance the effectiveness of such baits or lures by reason of the attraction or flash thereof, as when moved through the water in either cast retrieving or trolling.

A further and important object of the invention is to provide a fish hook guard advantageous for use on so-called gang hooks, permitting the same to be attached to substantially any type of top water, deep running or other under water baits.

The foregoing, as well as other objects, advantages and meritorius teachings of my invention, will be in part obvious and in part pointed out in the following detailed disclosure thereof, when taken in conjunction with the accompanying drawings, it being understood that the forms of invention presented herein are precise and what are now considered to be the better modes of embodying its principles, but that other modifications and changes may be made in specific embodiments without departing from its essential features.

Figure 1:
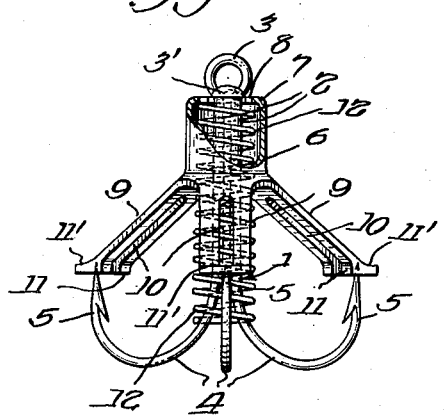
Figure 1 is a side elevation of my improved fish hook guard, showing it applied to a gang type of fish hook and in normal position, a portion of the body of the guard being broken away and shown in longitudinal section.
Figure 3:
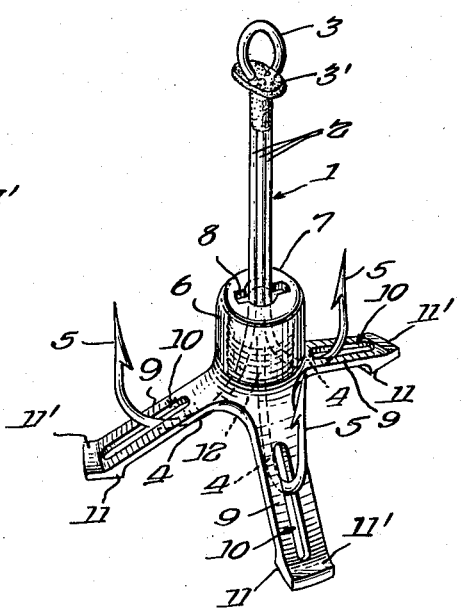
Figure 3 is a perspective view of the improved guard, as adapted to a gang type of fish hook, showing the guard arms receiving the hooks proper and their gaffs through the ways therein, as when the guard is "struck" by a fish.
Figure 2:
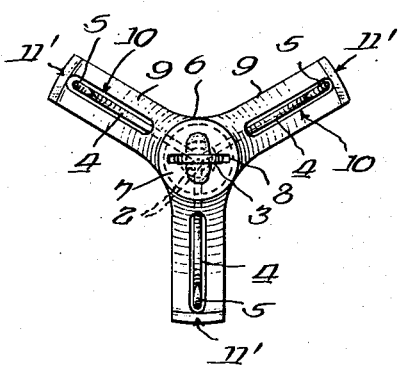
Figure 2 is a top plan view of the guard.

Referring in detail to the accompanying drawings, and particularly, to that form of the invention shown in Figures 1, 2 and 3, the same is especially adapted for use on a fish hook of the gang type generally comprising a plurality of substantially relatively immovable and spaced hooks (usually three in number) indicated by the numeral 1. The shanks 2 of the hooks lie parallel to each other, may be interconnected, and have an eye 3 or its equivalent connected to the outer adjacent ends thereof; the hooks 4 proper being outwardly curved, radially disposed and equi-spaced and formed or otherwise provided with the usual gaffs 5.

The invention, i. e., the improved guard, consists of a tubular or hollow cylindrically shaped body 6 whose outer end is partially closed by flanging, as at 7, and has a diametrically disposed way 8 therein. A plurality of complementally formed radially disposed and relatively spaced substantially rigid arms 9, corresponding in number to the number of the hooks proper 4, are integral with or fixedly connected to the inner or lower end of the body 6. Said arms are each correspondingly outwardly obliquely disposed with respect to the body 6 and coincide in their spacing to that between the hooks 4, aforesaid. A longitudinal slot or way 10 is formed in and parallel to the longitudinal sides of each of the arms 9, and as shown in the drawings, terminates inwardly of the outer and free end thereof, while its opposite end extends to a point in proximity to the jointure between its arm 9 and the body 6.

The free ends of the several arms 9 may be and preferably are somewhat enlarged, as at 11, and substantially straight along and over their inner faces; also, it is preferable that said enlarged portions shall be slightly shouldered, as at 11', for purposes hereinafter described.

The shanks 2 of the hooks are slidably received through the body 6 in the manner shown in Figure 1 of the drawings. In such position, the eye 3 is arranged beyond the body, being passed through its partially closed end via the diametrical way 8. Re-entrance of the eye carrying outer ends of the hook shanks 2 into the body 6 is prevented by a stop 3' carried on appropriate portions of said shanks and engaging across the diametrical way 8 and with the flanged end 7.

The hooks proper 4 with their gaffs 5 are positioned below or inwardly of the remaining open end of the body 6 and in such position, they are individually longitudinally aligned with the obliquely disposed guard arms 9. In these longitudinally aligned positions, the sharpened ends of the gaffs 5 are normally partially engaged or received in adjacent portions of the arm ways 10, though it will be noted that said sharpened ends do not engage entirely through said ways, but rather, are somewhat inset with relation to the outer sides of their respective arms—particularly, the enlarged free end portions 11 of said arms.

In order that the above described relative positioning between the guard arms 9, hooks proper 4 and their gaffs 5 will be normally, though movably maintained, an expansible coiled spring 12 of the proper tension is received in and longitudinally of the hollow cylindrical body 6, and over and above the juxtaposed shanks 2 of the gang hooks 1. One end of the spring has bearing on an adjacent portion of the body end partial closure 7. Its opposite or inner end has bearing engagement on adjacent portions of said hooks 1. Thus, it is seen that the hooks will be retained, under normal conditions, in the position shown in Figure 1. However, when a sufficient longitudinal or near longitudinal pull, thrust or other stress is imparted to the guard arms 9 or body 6 in a general direction toward the hooks proper 4 of the gang hooks 1, said body will be caused to slide over the hook shanks 2 against the tension of the now being compressed coiled spring 12 to a point adjacent and in bearing engagement with the shank basal portions. During this body sliding movement, the gaffs 5 of the hooks proper will move through the slots in their respective and adjacent guard arms 9, exposing the same to such an extent that they will function to engage and become set in matter adjacent the same—as for example, the flesh or other structure of a fish.

In use of a hook equipped with the herein described guard, the hook is attached to a swivel or other device of a bait or lure of desired form (not shown). The guard arms 9 overlying the sharpened ends of the hook gaffs, as above described, will substantially sheath and protect the latter and, of course, prevent them from being exposed or extended from or beyond adjacent portions of the outer faces of said arms where they may well become undesirably engaged with obstructions, etc.; moreover, dulled to states of inefficiency. The guard arms will be yieldably or movably retained in this described relationship by means of the expansible coiled spring 12 engaged over and about the gang hook shanks and received in the hollow cylindrically shaped body 6, in the manner previously described.

When pull, thrust or other stress is applied or directed to the outer sides of the guard arms 9 or to the body 6, as by the striking of a fish, it will be understood that the force of such applied stress will counteract the tension of the expansible coiled spring 12, permitting said body 6 and guard arms 9 to be slid inwardly over the gang hook shanks 2 toward the hooks proper 4 and allowing the sharpened ends of the hook gaffs to emerge outwardly from the ways 10 in the guard arms to positions where they will engage adjacent portions of the striking fish. Being so engaged, the barbs on the gaffs will, of course, become set in adjacent portions of the fish, and thereby, ensure the "catch." It may also be here noted that due to expansibility of the now compressed coiled spring 12 in the hollow cylindrically shaped bodies 6, the guard arms 9 will be urged in movement away from the hooks proper 4. Under such influence, it has been found that the outer sides of the guard arms 9 receiving the hook gaffs through the ways 10 therein produce an effectual clamping-like engagement of the hooked or impaled portions of the fish on and against the hook gaffs.

When a hook equipped with my improved guard is fished, as in top water, deep running water or trolling sports or modes of fishing, and is moved through such water, it will be appreciated by persons skilled in this pastime or sport that the oblique outwardly disposed guard arms 9 individually overlying the hooks proper 4 and their gaffs 5, will function to positively prevent their engagement or entanglement in submerged, partially submerged or unsubmerged obstructions or hazards, as for example, so-called seaweed, submerged bodies, etc. To this end, the resistance of the expansible coiled spring 12 to compression will be found sufficient to retain the guard arms 9 in their normal and obstruction deflecting positions, such as shown in Figure 1 of the drawings. Thereby, as and when the guard equipped hook is moved into, through or near obstructions, as above stated, they will be prevented, first, from becoming entangled with or caught on the gang hooks, and second, the gaffs of such hooks will be prevented from catching or becoming imbedded or snagged in such obstructions, in that the enlarged free ends 11 of the guard arms 9 will maintain their protective sheathing relationship to and over the gaff pointed ends.

As hereinbefore set forth, parts of the enlarged free end portions 11 of the guard arms 9 may be slightly shouldered, as indicated by the reference numeral 11'. This shouldering, I have found, is particularly effective in usage of the invention, to the end that when or should the same be engaged or struck by a fish, a greater striking area or surface is provided; hence, inward sliding movement of the guard with relation to the gaffs 5 of the gang hooks is ensured, and thereby, the gaffs are more certainly or surely engaged with the striking portion of the fish.

Figure 4:
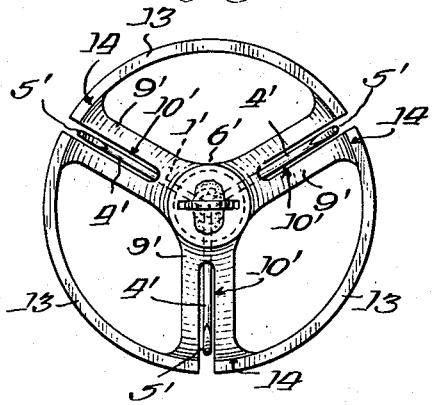
Figure 4 is a top plan view of a slightly modified form of the guard.

In Figure 4 of the accompanying drawings, I have shown a slightly modified form of guard for the hooks proper 4' of a gang type of fish hook 1'. The device includes a tubular or hollow cylindrically shaped body 6' carrying fixed and substantially rigid inwardly extending obliquely disposed guard arms 9'. These guard arms are in radial and substantially equi-spaced relation. Each thereof is formed with a longitudinal slot or way 10' parallel to its longitudinal sides. The outer ends of the ways extend to points in proximity to the jointure of the arms 9' with the body 6'; while their inner or lower ends open onto adjacent portions of their respective arms. The inner end portions of the arms 9' are interconnected by arcuately shaped strips 13 of material preferably, but not necessarily, like that from which said arms and body are formed; the strips being either integral with the arms or being otherwise permanently joined at their ends thereto. Thus, in assembly, the arcuate strips 13 comprise a substantially circular rim or deflector for the inner or lower ends of the arms 9'. The inner or lower ends of the ways 10', it will be noted, or not closed by the strips 13. Said strips, while being shown to be of rectangular cross-sectional shape, can be of any other or desired cross-sectional shape.

I prefer that portions of the outer sides of the strips 13 adjacent or in proximity to the ends of the arms 9' shall be shouldered, as at 14, similarly to the shoulders 11' effected in the first described embodiment of the invention and, of course, for similar purposes.

The arms 9' of the guard are individually longitudinally aligned with, and so, overlie corresponding hooks proper 4' and their gaffs 5' of the gang hook 1'. Thereby, the sharpened ends of the gaffs are normally shieldingly engaged in adjacent portions of aligning arm ways 10'. However, when the guard body 6' and its arms 9' are slid inwardly over the shanks 2' of the gang hook 1' against the tension of the expansible coiled spring 12' housed therein and engaged about and along said shanks, the gaffs 5' of the hooks proper will engage through the arm ways 9', and in so doing, will be exposed for engagement with and setting in adjacent portions of a striking fish.

The circular rim or deflector constituted by the arcuate strips 13, will effectively serve to prevent the passage and/or engagement of weeds or like vegetation, or other bodies, between and with the guard arms 9', hence, preventing its catching, fouling, snagging, etc.

A fish hook guard constructed in accordance with my invention will not only prevent fouling or snagging of a hook or hooks equipped therewith, but also, will afford a definite and most desirable safety factor, in that the sharpened gaff ends will, normally, be sheathed or shielded and thereby prevented from becoming accidentally and/or harmfully engaged in portions of the body of a user or of a nearby person, as during rigging or casting thereof. Moreover, the device will provide additional attraction and flash to a lure to which it is attached, hence, enhancing the effectiveness of the latter.

While I have heretofore described my improved guard as being used on a gang hook, it is to be understood that the same may, with certain modifications well within the province of the invention, be adapted to single hooks; likewise, that when employed on gang hooks, the number of hooks comprised thereby can be varied and, of course, the number of guard arms made to correspond thereto, such as conditions or preference may dictate.

I claim:

1. In combination with a gang fish hook, a cap-like guard engaged about and slidable over the shanks of the hooks, the inner end of said guard being normally juxtapositioned with relation to and cappingly covering the gaffs of the hooks, with the remainders of the hooks outwardly thereof and exposed portions of said guard adjacent the hook gaffs having ways formed therein permitting said gaffs to enter into and pass outwardly therethrough, and means on the hook shanks engaging the guard operable to normally retain the latter in said juxtapositioned relation to and over the sharpened ends of the hook gaffs.

2. In combination with a gang fish hook, a body received on and slidable over the hooks, a plurality of outwardly extended and obliquely disposed relatively spaced arms carried by said body, each of said arms having longitudinal ways formed therein, said arms being individually longitudinally aligned with the hooks and their gaffs and the ways therein receiving the sharpened ends of the hook gaffs therein, and means engaging the body for normally and movably retaining the inner and free end portions of the arms in juxtaposed relation to and over the sharpened ends of the hook gaffs.

3. A fish hook guard, comprising a substantially outwardly tapered hook guard means, a sleeve on one end of the guard means, the shanks of the hooks being slidably received through the guard means and the sleeve, the remaining and inner end of the guard means being normally juxtapositioned with relation to and cappingly covering the gaffs of the hooks with the remainders of the hooks exposed, and means on the hook shanks engaging the sleeve to normally retain the guard means in said juxtapositioned relation to the hook gaffs.

4. A fish hook guard, comprising an outwardly tapered body having a longitudinal way in and through the outer end thereof, said body including a plurality of relatively spaced and substantially rigid arms, each of said arms having longitudinally disposed ways therein extending to points in proximity to the inner and free ends of said arms, the arms being individually disposed over and beyond the hook gaffs and said gaffs being adjacent to and engageable through the ways in the adjacent arms, and means on the hook shanks engaging the body operable to normally retain the latter and its arms in juxtaposed relation to the hook gaffs.

5. A fish hook guard, comprising a plurality of relatively grouped and fixed complemental arms, said arms being each obliquely disposed and converging into interjointure at their outer ends and having a way therethrough slidably receiving the shanks of the hooks, each of the arms having longitudinally disposed ways therein extending to points in proximity to their inner and free ends, the arms being normally received over and extending beyond the adjacent hook gaffs, said gaffs being adjacent to and engageable through the ways in the adjacent arms, and means on the hook shanks engaging the joined outer ends of said arms operable to normally though movably retain said arms over and extended beyond the hook gaffs.

6. A fish hook guard, comprising a body received on and slidable over the shanks of the hooks, a plurality of outwardly extended and obliquely disposed relatively spaced arms carried by said body, each of said arms having longitudinal ways formed therein, said arms being individually longitudinally aligned with the hooks and their gaffs, the ways in the arms receiving the sharpened ends of the hook gaffs therein, and means engaging the body for normally and movably retaining the free end portions of the arms in juxtaposed relation to and over the sharpened ends of the hook gaffs.

7. A fish hook guard, comprising a body received on and slidable over the shanks of the hooks, a plurality of outwardly extended and obliquely disposed relatively spaced arms carried by said body, each of said arms having longitudinal ways formed therein and opening onto their free ends, said arms being individually longitudinally aligned with the hooks and their gaffs, the ways in the arms receiving the sharpened ends of the hook gaffs therein, deflector means disposed between outer end portions of the arms and fixed thereto, and means engaging the body for normally and movably retaining the free end portions of the arms in juxtaposed relation to and over the sharpened ends of the hook gaffs.

8. A fish hook guard, comprising a body received on and slidable over the shanks of the hooks, a plurality of outwardly extended and obliquely disposed relatively spaced arms carried by said body, each of said arms having longitudinal ways formed therein opening onto their free ends, said arms being individually longitudinally aligned with the hooks and their gaffs, the ways in the arms receiving the sharpened ends of the hook gaffs therein, strips disposed between the outer end portions of the arms and fixed thereto in proximity to the opposite sides of the open ends of the longitudinal ways therein, and means engaging the body for normally and movably retaining the free end portions of the arms in juxtaposed relation to and over the sharpened ends of the hook gaffs.

9. A fish hook guard, comprising a body received on and slidable over the shanks of the hooks, a plurality of outwardly extended and obliquely disposed relatively spaced arms carried by said body, each of said arms having longitudinal ways formed therein opening onto their free ends, said arms and the ways therein being individually longitudinally aligned with the hooks and their gaffs, the ways in the arms receiving the sharpened ends of the hook gaffs therein, a ring-like deflector fixedly carried by the outer end portions of said arms having openings therein adjacent to and aligned with the outer ends of the ways in said arms, and means engaging the body for normally and movably retaining the free end portions of the arms in juxtaposed relation to and over the sharpened ends of the hook gaffs.

10. A fish hook guard, comprising a body received on and slidable over the shanks of the hooks, a plurality of outwardly extending and obliquely disposed relatively spaced and substantially rigid arms carried by said body, each of said arms having longitudinal ways formed therein for portions of their respective lengths, said arms and their ways being individually longitudinally aligned with the hooks and their gaffs, the ways in said arms receiving the sharpened ends of the hook gaffs therein, and deflector means carried by the outer end portions of said arms and spanning the space therebetween.

11. A guard for gang fish hooks, each hook having a shank, said guard comprising a body received on and slidable over the hook shanks, a cap-like guard carried by said body the inner end of which is normally juxtapositioned with relation to and cappingly covers the gaffs of the hooks with the remainders of the hooks extending outwardly thereof and exposed, portions of the guard having ways formed therein permitting the hooks and their gaffs to enter into and pass outwardly therethrough, and means engaged about the hook shanks bearing on the body normally retaining the guard in said juxtapositioned relation to and over the sharpened ends of the hook gaffs, but allowing, at times, longitudinal sliding movement of the body and guard with relation to the hooks.

JAMES V. MODESTO.

REFERENCES CITED

The following references are of record in the file of this patent:

UNITED STATES PATENTS

| Number | Name | Date |
| --- | --- | --- |
| 913,102 | Burke | Feb. 23, 1909 |